(12) United States Patent
Arakawa

(10) Patent No.: US 11,142,145 B2
(45) Date of Patent: Oct. 12, 2021

(54) WIRE HARNESS FOR REGULATING A ROUTING PATH

(71) Applicant: SUMITOMO WIRING SYSTEMS, LTD., Yokkaichi (JP)

(72) Inventor: Hiroyuki Arakawa, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/979,328

(22) PCT Filed: Feb. 26, 2019

(86) PCT No.: PCT/JP2019/007323
§ 371 (c)(1),
(2) Date: Sep. 9, 2020

(87) PCT Pub. No.: WO2019/172018
PCT Pub. Date: Sep. 12, 2019

(65) Prior Publication Data
US 2021/0001791 A1    Jan. 7, 2021

(30) Foreign Application Priority Data
Mar. 9, 2018 (JP) .............................. JP2018-042906

(51) Int. Cl.
*B60R 16/02* (2006.01)
*H02G 3/04* (2006.01)

(52) U.S. Cl.
CPC ....... *B60R 16/0215* (2013.01); *H02G 3/0462* (2013.01)

(58) Field of Classification Search
CPC .......................... B60R 16/0215; H02G 3/0462

USPC .......................................................... 174/72 A
See application file for complete search history.

(56) References Cited

U.S. PATENT DOCUMENTS

| | | | | |
|---|---|---|---|---|
| 3,341,803 A | * | 9/1967 | Bustamante | H01R 33/09 439/111 |
| 4,379,473 A | * | 4/1983 | Kunze | B29C 61/10 138/167 |
| 7,709,739 B2 | * | 5/2010 | Ferragut | H02G 3/0633 174/74 R |
| 10,128,643 B2 | * | 11/2018 | McDonald | H01B 7/0045 |
| 2008/0308316 A1 | | 12/2008 | Ferragut et al. | |

(Continued)

FOREIGN PATENT DOCUMENTS

| | | |
|---|---|---|
| JP | H08-98368 A | 4/1996 |
| JP | 2009-512152 A | 3/2009 |

(Continued)

OTHER PUBLICATIONS

Mar. 26, 2019 International Search Report issued in International Patent Application No. PCT/JP2019/007323.

*Primary Examiner* — Timothy J Thompson
*Assistant Examiner* — Michael F McAllister
(74) *Attorney, Agent, or Firm* — Oliff PLC

(57) ABSTRACT

A wire harness including: an electrical wire including a core wire and a covering that covers an outer circumference of the core wire; and a routing path regulator that has a higher rigidity than the core wire and is configured to regulate a routing path of the electrical wire by being provided adjacent to the core wire between ends of the core wire and being covered, together with the core wire, by the covering.

4 Claims, 3 Drawing Sheets

(56) References Cited

U.S. PATENT DOCUMENTS

| | | | | |
|---|---|---|---|---|
| 2014/0090886 A1* | 4/2014 | Okuhara | .............. | H02G 3/0481 |
| | | | | 174/72 A |
| 2014/0231135 A1* | 8/2014 | Okuhara | ................ | H02G 5/066 |
| | | | | 174/99 R |
| 2016/0064118 A1* | 3/2016 | Wakabayashi | ....... | H01B 7/0018 |
| | | | | 174/72 A |

FOREIGN PATENT DOCUMENTS

| JP | 2012-22803 A | 2/2012 |
|---|---|---|
| JP | 2016-46943 A | 4/2016 |

\* cited by examiner

WIRE HARNESS FOR REGULATING A ROUTING PATH

BACKGROUND

The present disclosure relates to a wire harness.

Conventionally, a vehicle includes a protector for routing a wire harness along a predetermined routing path (for example, see JP 2016-46943A). A protector disclosed in JP 2016-46943A includes a protector body having a recessed portion in which an electrical wire can be accommodated, and a covering member for closing an opening of the recessed portion. By using a protector shaped in conformity with the predetermined routing path, the routing path for the wire harness accommodated in the protector is regulated.

Moreover, some wire harnesses have such a configuration that an electrical wire is provided along a bar-shaped routing path regulating member (which may be referred to as a "splint") that is made from aluminum or the like and is curved along the predetermined routing path, and holding portions are provided at which the electrical wire and the routing path regulating member are held with an adhesive tape. In such a wire harness, the plurality of fixing portions are provided with an interval therebetween in a longitudinal direction of the routing path regulating member.

SUMMARY

The wire harness disclosed in JP 2016-46943A is such that the outer circumference of the electrical wire is covered by the protector, thereby giving the wire harness a large structure. This leads to a drawback in that a large space is necessary for routing the wire harness.

Moreover, in the case of the wire harness including the routing path regulating member, it is possible to hold the electrical wire and the routing path regulating member at each holding portion, but twisting of the routing path regulating member is likely to occur in the intervals between the holding portions, and thus there is a risk that the wire harness will be misaligned from the predetermined routing path in the intervals.

An exemplary aspect of the disclosure provides a wire harness that is capable of regulating the routing path using a simple configuration.

A wire harness according to an exemplary aspect includes an electrical wire including a core wire and a covering that covers an outer circumference of the core wire; and a routing path regulator that has a higher rigidity than the core wire and is configured to regulate a routing path of the electrical wire by being provided adjacent to the core wire between ends of the core wire and being covered, together with the core wire, by the covering.

With this configuration, the routing path regulator is provided adjacent to the core wire between the ends of the core wire and the routing path regulator is covered, together with the core wire, by the covering, and therefore the routing path regulator is fixed to the core wire, thereby making it possible to regulate the routing path of the electrical wire by using the routing path regulator shaped in conformity with the routing path of the wire harness. This makes it possible to suppress relative displacement of the routing path regulator with respect to the core wire in a circumferential direction about an axis of the core wire. Moreover, with this configuration, it is possible to suppress an increase in the size of a structure of the wire harness, compared with a configuration in which the routing of the electrical wire is regulated by using a protector covering the outer circumference of the electrical wire. Accordingly, it is possible to regulate the routing path of the wire harness by using a simple configuration.

In the above-described wire harness, it is preferable that the routing path regulator is provided in correspondence with part of the core wire in a longitudinal direction of the core wire, and the covering includes a first covering configured to cover an outer circumference of a portion of the core wire that is not provided with the routing path regulator in the longitudinal direction, and a second covering configured to cover an outer circumference of both the core wire and the routing path regulator.

For example, in a case where a routing path regulator is provided over the entire core wire in the longitudinal direction, the outer circumference of the core wire and the routing path regulator is covered over its entirety in the longitudinal direction by a covering in a state in which the core wire and the routing path regulator that each extend straight are adjacent to each other. Accordingly, this case requires a task of bending the routing path regulator, the core wire, and the covering together in order to bend a predetermined portion of the wire harness into a shape corresponding to the routing path. However, if the covering has a high rigidity, the bending task will be difficult, thereby making the routing of the wire harness difficult.

In this regard, with the aforementioned configuration, for example, after the outer circumference of the core wire is covered over its entirety in the longitudinal direction by the first covering, a portion of the first covering at which the routing path regulator is to be provided adjacent to the core wire is removed. Thereafter, the outer circumference of the core wire and the routing path regulator is covered by the second covering in a state in which the core wire is provided along the routing path regulator molded in the predetermined shape. Producing the wire harness in this way eliminates the need for the task of bending the routing path regulator, the core wire, and the covering together. Accordingly, the wire harness can be easily routed.

In the above-described wire harness, it is preferable that the second covering is a thermal shrinkable tube.

This configuration makes it possible to easily cover the outer circumference of the routing path regulator and the core wire in a state in which the core wire is provided along the routing path regulator.

In the above-described wire harness, it is preferable that the routing path regulator is made of a metal material identical to that of the core wire.

With this configuration, because the routing path regulator is made of a metal material identical to that of the core wire, it is possible to suppress electrolytic corrosion between the routing path regulator and the core wire.

According to the present disclosure, it is possible to regulate the routing path of the wire harness using a simple configuration.

DETAILED DESCRIPTION OF EMBODIMENTS

One embodiment will be described below with reference to FIGS. 1 to 3.

Figure 1:
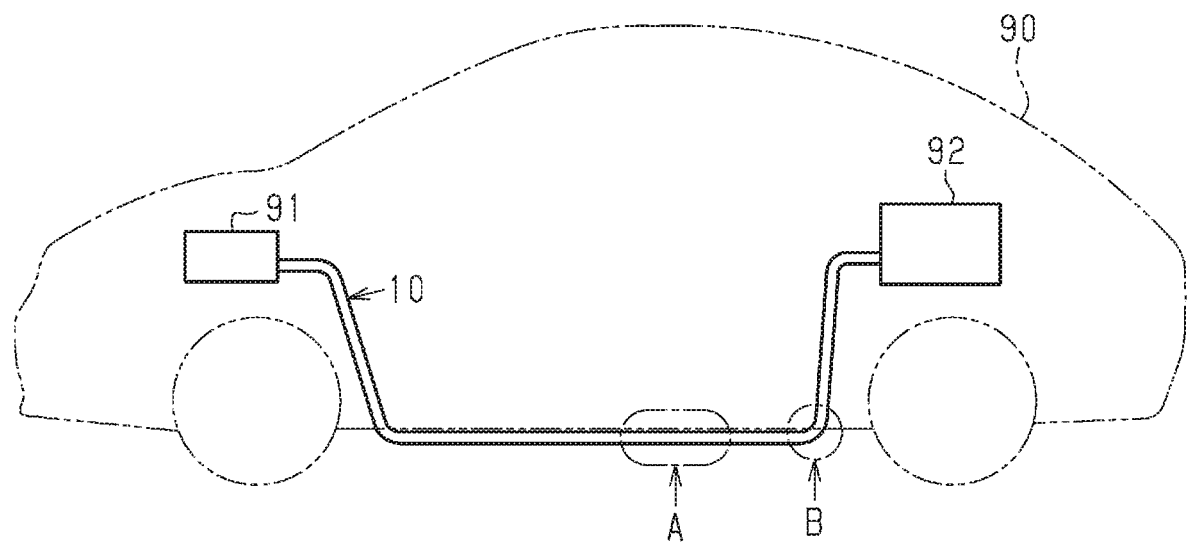
FIG. 1 is a side view illustrating a wire harness routed in a vehicle, according to one embodiment of wire harness.

As illustrated in FIG. 1, a wire harness 10 is configured to be routed in a path in a vehicle 90 such as a hybrid vehicle or an electric vehicle in such a way that part of the path is routed under a floor of the vehicle 90. The wire harness 10 is configured to electrically connect a motor 91 provided in a front portion of the vehicle 90 with an inverter 92 provided in a rear portion of the vehicle 90.

Figure 2:
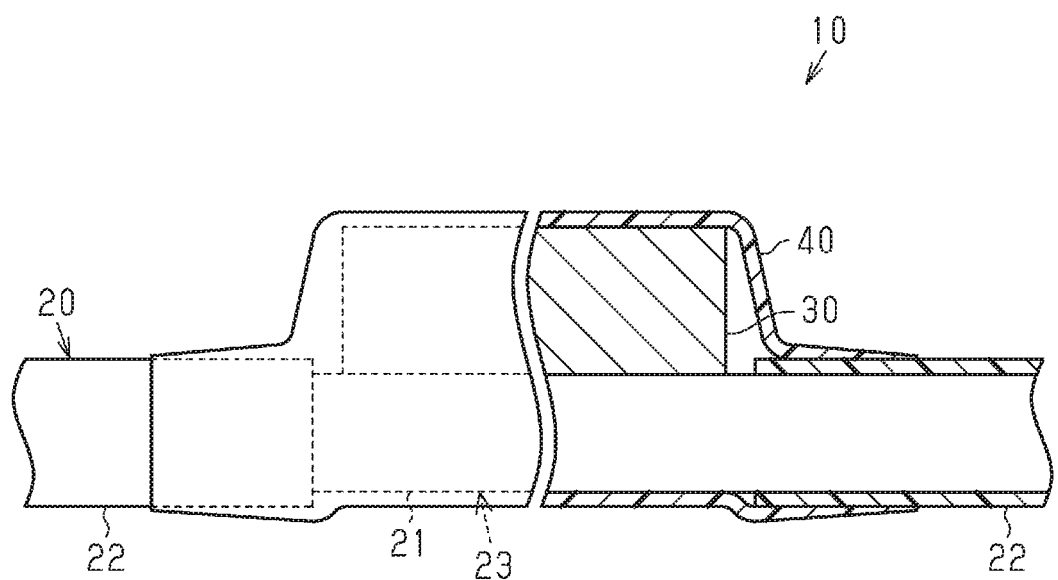
FIG. 2 is a partial cross-sectional view illustrating, in an enlarged manner, a portion A illustrated in FIG. 1.
Figure 3:
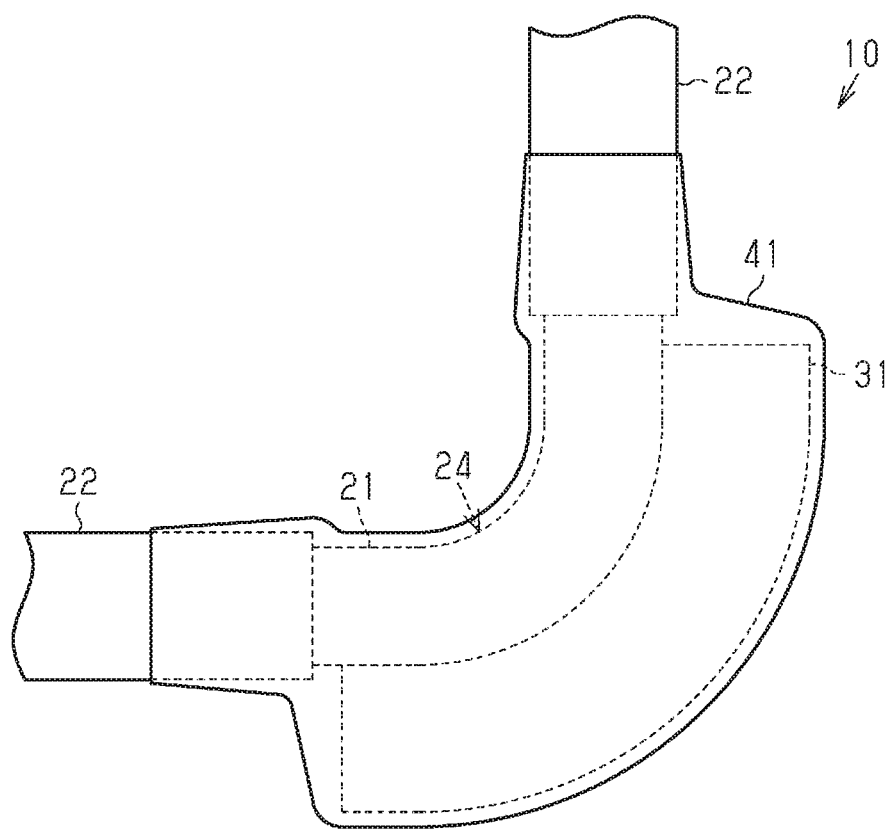
FIG. 3 is a side view illustrating, in an enlarged manner, a portion B illustrated in FIG. 1.

As illustrated in FIGS. 2 and 3, the wire harness 10 includes an electrical wire 20 including a core wire 21 and a first covering member 22 (covering) that has a tubular shape and covers the outer circumference of the core wire 21. It should be noted that the electrical wire 20 may include one electrical wire 20 or may include a plurality of electrical wires 20. The core wire 21 is, for example, a twisted wire formed by twisting a plurality of metal strands made from a copper alloy. The first covering member 22 is formed by, for example, extrusion molding of an electrical insulating material such as polyvinyl chloride (PVC). At both end portions of the core wire 21, the first covering member 22 is not provided, but terminals (not illustrated) that are to be connected to a motor 91 or an inverter 92 are provided.

The wire harness 10 includes a plurality of routing path regulating members for regulating a routing path for the electrical wire 20.

Next, routing path regulating structures of the routing path regulating members for a straight portion and a curved portion of the electrical wire 20 will be described.

Straight Portion

As illustrated in FIG. 2, the straight portion (the portion A in FIG. 1) is a portion of the electrical wire 20 of the wire harness 10 that extends along and under a floor of the vehicle 90, and the straight portion includes, in a longitudinal direction of the core wire 21, an exposed portion 23, which is not covered by the first covering member 22 and from which the core wire 21 is exposed. The exposed portion 23 is formed by removing part of the first covering member 22 provided over the entire core wire 21 in the longitudinal direction.

At a portion of the core wire 21 in the exposed portion 23, a routing path regulating member 30 (routing path regulator) that has a higher rigidity than the core wire 21 is provided adjacent to the core wire 21. The routing path regulating member 30 is a round bar made from a metal material identical to that of the core wire 21 (which is the copper alloy in the present embodiment). The routing path regulating member 30 has a cross-section orthogonal to the longitudinal direction of the routing path regulating member 30, the cross section having a cross-sectional area that is substantially identical to a cross-sectional area of a cross-section of the electrical wire 20 orthogonal to the longitudinal direction of the electrical wire 20.

The exposed portion 23 is provided with a second covering member 40 (covering) configured to cover the outer circumference of both the core wire 21 and the routing path regulating member 30. The second covering member 40 covers the core wire 21 and the routing path regulating member 30 as well as the outer circumferences of both end portions of the first covering members 22 that are adjacent to the exposed portion 23. The second covering member 40 is a thermal shrinkable tube made from polyolefin-based resin or the like.

Curved Portion

As illustrated in FIG. 3, the curved portion (the portion B in FIG. 1) is a part of the electrical wire 20 of the wire harness 10 at which the routing path curves, and the curved portion includes an exposed portion 24 at which the core wire 21 is not covered by the first covering member 22. At a portion of the core wire 21 in the exposed portion 24, a routing path regulating member 31 having a curved shape that conforms to the routing path is provided adjacent to the core wire 21. The routing path regulating member 31 has a higher rigidity than the core wire 21 and is a round bar made of, for example, a material identical to that of the routing path regulating member 30 for the straight portion (which is the copper alloy in the present embodiment). The portion of the core wire 21 in the exposed portion 24 curves along the routing path regulating member 31. In this state, the outer circumference of both the core wire 21 and the routing path regulating member 31 is covered by a second covering member 41. The second covering member 41 is a thermal shrinkable tube of the same kind as the second covering member 40 for the straight portion.

Next, a production procedure for the wire harness 10 will be described.

To begin with, the the core wire 21 is covered over its entirety in the longitudinal direction by the first covering member 22. After that, portions of the first covering member 22 are removed at respective locations where the routing path regulating member 30 and 31 are to be provided adjacent to the core wire 21, thereby forming the exposed portions 23 and 24 where the core wire 21 is not covered by the first covering member 22. After that, the thermal shrinkable tubes that will constitute the second covering members 40 and 41 are provided to cover the outer circumferences of both the core wire 21 and the routing path regulating members 30 and 31 in a state in which the core wire 21 is provided along the routing path regulating members 30 and 31 molded in predetermined shapes (a straight shape and a curved shape). After that, the thermal shrinkable tubes are heated and shrunk, thereby causing the thermal shrinkable tubes to come into close contact with the routing path regulating members 30 and 31, and the core wire 21. In this way, the wire harness 10 is produced.

Actions of the present embodiment will be described below.

In the exposed portions 23 and 24, the routing path regulating members 30 and 31, which have a higher rigidity than the core wire 21, are provided adjacent to the core wire 21. By covering the outer circumferences of both the core wire 21 and the routing path regulating members 30 and 31 with the second covering members 40 and 41, the routing path regulating members 30 and 31 are fixed to the core wire 21. Therefore, the core wire 21 is routed in conformity with the shapes of the routing path regulating members 30 and 31 in the exposed portions 23 and 24.

Moreover, the second covering members 40 and 41 make it possible to reduce relative displacement of the routing path regulating members 30 and 31 with respect to the core wire 21 in a circumferential direction about an axis of the core wire 21.

Advantageous effects of the present embodiment will be described below.

(1) The wire harness 10 includes an electrical wire 20 including a core wire 21 and a first covering member 22 covering an outer circumference of the core wire 21, and routing path regulating members 30 and 31 that have a higher rigidity than the core wire 21 and are configured to regulate the routing path of the electrical wire 20 by being provided adjacent to the core wire 21 between both ends of the core wire 21 and being covered, together with the core wire 21, by second covering members 40 and 41, respectively.

With this configuration, the actions described above can be achieved, thereby making it possible to regulate the routing path of the electrical wire 20 by using the routing path regulating members 30 and 31 shaped in conformity with the routing path of the wire harness 10. Moreover, with this configuration, it is possible to suppress an increase in the size of the structure of the wire harness 10, compared with the configuration in which the routing path of the electrical wire 20 is regulated by using a protector covering the outer circumference of the electrical wire 20. Therefore, the routing path of the wire harness can be regulated by using a simple configuration.

(2) The routing path regulating members 30 and 31 are provided in correspondence with parts of the core wire 21 in the longitudinal direction. For example, in a case where the routing path regulating members 30 and 31 are provided in correspondence with the entire core wire 21 in the longitudinal direction, the outer circumference of the core wire 21 and the routing path regulating member is covered over its entirety in the longitudinal direction by a covering member in a state in which the core wire 21 and the routing path regulating member that each extend in a straight line are adjacent to each other. Accordingly, this case requires a task of bending the routing path regulating member, the core wire 21, and the covering member together in order to bend a predetermined portion of the wire harness into a shape corresponding to the routing path. However, if the covering member has a high rigidity, the bending operation will be difficult, thereby making the routing of the wire harness difficult.

In this regard, with the aforementioned configuration, the wire harness 10 can be produced by covering the outer circumferences of the core wire 21 and the routing path regulating member 30 or 31 with the second covering member 40 or 41 in a state in which the core wire 21 is provided along the routing path regulating members 30 and 31 molded into predetermined shapes. Producing the wire harness 10 in this way eliminates the need for the task of bending the routing path regulating member 30 or 31, the core wire 21, and the first covering member 22 together. Therefore, the task of routing the wire harness 10 can be performed easily.

(3) The second covering members 40 and 41 are thermal shrinkable tubes. Therefore, the outer circumferences of the routing path regulating members 30 and 31 and the core wire 21 can be easily covered by the second covering members 40 and 41 in a state in which the routing path regulating members 30 and 31 are provided along the core wire 21.

(4) Because the routing path regulating members 30 and 31 are made from a metal material (copper alloy) identical to that of the core wire 21, it is possible to suppress electrolytic corrosion between the routing path regulating members 30 and 31 and the core wire 21.

(5) Because the routing path regulating members 30 and 31 are made from a metal material, it is easier to perform bending or shape correction, compared with a case where the routing path regulating members are made from a resin material, for example.

The present embodiment can be modified and implemented as follows. The present embodiment and the following modifications may be combined and implemented as long as they do not technically contradict each other.

Figure 4:
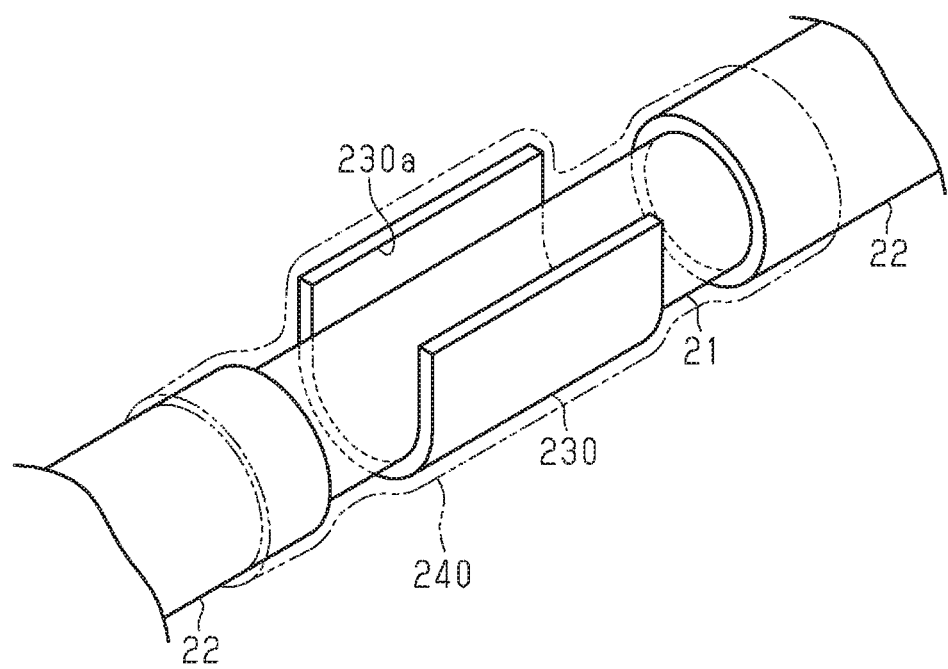
FIG. 4 is a perspective view of a wire harness according to a first modified example.

The shapes of the routing path regulating members 30 and 31 are not limited to the round bars. As an alternative, for example, as illustrated in FIG. 4, a routing path regulating member 230 extending along the core wire 21 and having a U-shaped cross-section can also be employed. In this case, the core wire 21 need only be accommodated in a recessed portion 230a of the routing path regulating member 230, and the core wire 21 and the routing path regulating member 230 need only be covered by a second covering member 240. This configuration makes it possible to further suppress an increase in the size of the structure of the wire harness. Moreover, this configuration makes it possible to easily position the core wire 21 along the routing path regulating member 230.

The routing path regulating members 30 and 31 are not limited to the copper alloy. As an alternative, the routing path regulating members can also be formed from another metal material such as aluminum. Moreover, the routing path regulating members can also be formed from a resin material. In this case, the routing path regulating members need only be molded in advance into predetermined shapes conforming to the routing path of the wire harness.

The cross-sectional area of the cross-section orthogonal to the longitudinal direction of the routing path regulating member 30 need not be substantially identical to the cross-sectional area of the cross-section orthogonal to the longitudinal direction of the electrical wire 20, as long as the routing path regulating member 30 can regulate the routing path of the electrical wire 20. For example, the cross-sectional area of the cross-section of the routing path regulating member 30 orthogonal to the longitudinal direction of the routing path regulating member 30 may also be smaller than the cross-sectional area of the cross-section of the electrical wire 20 orthogonal to the longitudinal direction of the electrical wire 20.

The covering of the exposed portions 23 and 24 of the core wire 21 may also be carried out with resin molds instead of the thermal shrinkable tubes. In this case, it is possible to effectively suppress a case in which water enters from a terminal of the electrical wire 20 and reaches the exposed portion 23 or 24. For this reason, it is possible to suppress the electrolytic corrosion between the routing path regulating members 30 and 31 and the core wire 21. Moreover, this makes it possible to constitute the routing path regulating members and the core wire using different metals.

An exposed portion where the core wire 21 is not covered by the first covering member 22 can also be formed by removing part of the first covering member 22 in a circumferential direction, and the routing path regulating member can provided at the exposed portion.

An exposed portion where the core wire 21 is not covered by the first covering member 22 can also be formed at a portion between an end portion of the core wire 21 and the first covering member 22, and the routing path regulating member can be provided at the exposed portion.

After the core wire 21 and the routing path regulating member 30 are covered by the second covering member 40, the core wire 21, the routing path regulating member 30, and the second covering member 40 may also be bent together in conformity with the shape of the routing path.

Figure 5:
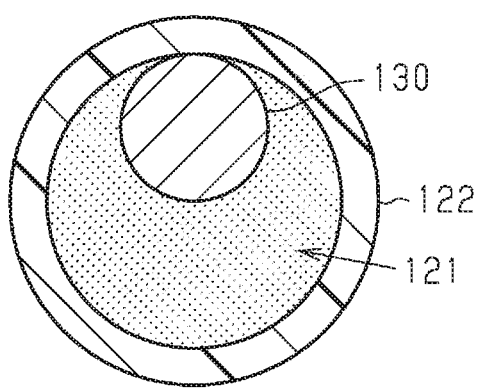
FIG. 5 is a cross-sectional view of a wire harness according to a second modified example.

The second covering member can also be omitted. That is, as illustrated in FIG. 5, a core wire 121 and a routing path regulating member 130 may also be covered by a first covering member 122.

The core wire 21 is not limited to being made from the copper alloy. As an alternative, a highly electrically conductive metal such as an aluminum alloy can also be employed.

The invention claimed is:

1. A wire harness comprising:
an electrical wire including a core wire and a covering that covers an outer circumference of the core wire; and
a routing path regulator that has a higher rigidity than the core wire and is configured to regulate a routing path of the electrical wire by being provided adjacent to the core wire between ends of the core wire and being covered, together with the core wire, by the covering, wherein
the covering includes a first covering configured to cover an outer circumference of a portion of the core wire that is not provided with the routing path regulator in the longitudinal direction, and a second covering configured to cover an outer circumference of both the core wire and the routing path regulator.

2. The wire harness according to claim 1, wherein
the routing path regulator is provided in correspondence with part of the core wire in a longitudinal direction of the core wire.

3. The wire harness according to claim 2, wherein the second covering is a thermal shrinkable tube.

4. The wire harness according to claim 1, wherein the routing path regulator is made of a metal material identical to that of the core wire.

* * * * *